United States Patent [19]

Wullenwaber

[11] Patent Number: 4,602,711
[45] Date of Patent: Jul. 29, 1986

[54] APPARATUS FOR FEEDING CYLINDRICAL WORKPIECES TO A WORKPLACE

[76] Inventor: Robert W. Wullenwaber, 1141 St. Regis Pl., Santa Ana, Calif. 92705

[21] Appl. No.: 620,905

[22] Filed: Jun. 15, 1984

[51] Int. Cl.⁴ ............................................. B65G 47/04
[52] U.S. Cl. ..................................... 198/533; 198/524; 198/609; 198/771; 414/404; 414/415; 221/10
[58] Field of Search ............... 198/533, 524, 609, 347, 198/382, 390, 771, 358; 221/10, 11; 414/404, 405, 415

[56] References Cited

U.S. PATENT DOCUMENTS

| | | | |
|---|---|---|---|
| 2,638,248 | 5/1953 | Alvord | 198/524 X |
| 3,298,564 | 1/1967 | Wheatley et al. | 221/10 |
| 3,717,050 | 11/1975 | Gregor | 198/358 |
| 3,817,369 | 6/1977 | Bluthardt et al. | 198/347 |
| 4,171,051 | 10/1979 | Wullenwaber | 209/542 |
| 4,462,508 | 7/1984 | Grafius | 198/382 X |

FOREIGN PATENT DOCUMENTS 1114037 4/1956 France ................................. 221/10

Primary Examiner—Joseph E. Valenza
Assistant Examiner—Michael Stone
Attorney, Agent, or Firm—Spensley Horn Jubas & Lubitz

[57] ABSTRACT

A device for feeding cylindrical components such as diodes, resistors or capacitors includes a buffer container for receiving components from a storage container, a horizontal exit track at the bottom of the buffer container, a delivery container for receiving components from the exit track, and a zig-zag delivery track. The storage container and buffer container have serpentine chambers and vibrator assemblies are employed to move components through the containers. The flow of components is halted by stopping the vibrators, thereby controlling the component flow rate and preventing jamming.

7 Claims, 3 Drawing Figures

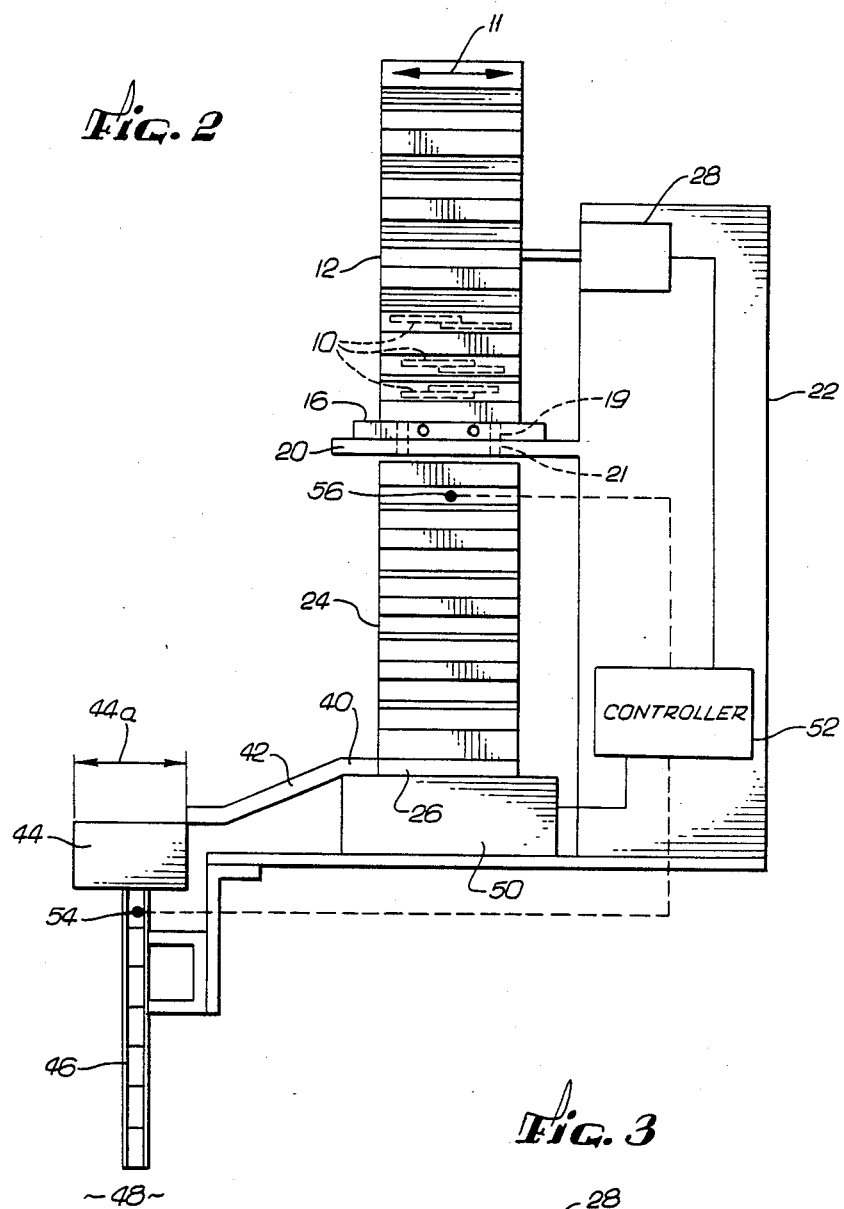
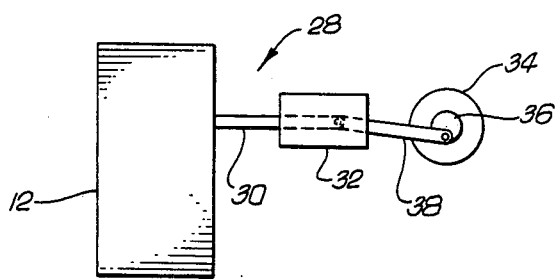

APPARATUS FOR FEEDING CYLINDRICAL WORKPIECES TO A WORKPLACE

BACKGROUND OF THE INVENTION

1. Field of the Invention

The present invention relates to the feeding of cylindrical components to a work station and more particularly to the feeding of axial lead electronic components, such as resistors, diodes and capacitors.

Many types of manufacturing operations require the transmission of individual cylindrical components to an assembly station for automatic or manual incorporation of the component into a product or subassembly. In particular, the manufacture of electronic products frequently utilizes large numbers of axial lead electronic components. These components are often obtained in bulk, and must be dispensed serially in a manner permitting their utilization in such operations as automatic or manual insertion into circuit boards.

2. Description of the Prior Art

A common method of serializing axial lead components from a bulk stock is to employ a vibrating bowl. Bulk components are fed into the bowl, and vibrations of the bowl, in conjuncton with the force of gravity, cause components to align with an exit of the bowl. Parts leaving the bowl enter a vertically disposed track. The longitudinal interior cross-section of the track is just slightly larger than the body of the axial lead component, thus maintaining components within the track in a serialized, single-file disposition. Longitudinal slots run the full length of two parallel sides of the track. The slots are wide enough to permit the component leads to protrude through the slot, yet small enough to prevent the body of the component from protruding through the slot.

The parts-carrying tracks often have a zig-zag, or saw-toothed slot disposition, rather than being straight tracks. The zig-zag path slows the vertical descent rate of the part to a desired value less than what would be achieved by free-fall of the parts. Furthermore, parts queing which occurs at saw-toothed vertices tends to bring parts within the track into an adjacent, parallel configuration, with bodies of the parts essentially horizontal.

Parts that have once entered the zig-zag track from a vibratory bowl feeder usually travel without difficulty. However, vibratory bowl feeders are frequently plagued by jams occurring within the bowl and at the bowl exit. Also, the susceptibility to jamming of vibratory bowl feeders is aggravated by even slight bends in the component leads.

In addition to vibratory bowl feeders, feeders which employ magnetic fields have been developed. One obvious disadvantage of magnetic field feeders is the limitation of the usage to components having magnetic leads.

A system which does not use either a vibratory bowl feeder or magnetic fields is disclosed in U.S. Pat. No. 4,171,051 to Wullenwaber, the same inventor as in the present application. In the system disclosed in this patent, bulk components are fed to a "feeder-serializer" which produces a single-file progression of components. Three chambers are defined in the serializer by means of blocking gates which are movable into and out of the path of components moving through the serializer. By defining an upper entrance chamber, an intermediate storage chamber and a lower exit chamber, and properly controlling the operation of the gates, the number of components in the lower exit chamber is limited and jamming at the exit is prevented. Although this apparatus has distinct advantages over vibratory bowl feeders, it is also susceptible to jamming problems as a result of the operation of the gates which move in and out of the path of the components.

SUMMARY OF THE INVENTION

The present invention is directed to an apparatus for receiving bulk electronic components and providing them to a workplace in a single-file progression at high feed rates and without jamming. To accomplish this, the apparatus is provided with a buffer container for receiving bulk components and providing an initial serialized output of components, a delivery container for receiving components from the buffer container, and a conveyor track connected to an outlet of the delivery container for feeding a single-file progression of components to a workplace. In order to minimize the possibility of jamming, no moving gates are employed. Rather, the buffer chamber is designed so that in the absence of motion it will support and maintain a plurality of components in its interior. In order to feed components from the buffer container to the delivery container, means are provided to vibrate the buffer container. The buffer container has a horizontal exit track and vibration of the container will cause the components to move longitudinally along the exit track. The delivery container is located below the exit of the buffer container and receives components via an inclined slide plate coupled to the exit track. The delivery track is located below the delivery container and components move to the track from the container under the influence of gravity and vibration. The level of components in the delivery track is monitored by means of an optical sensor. When the level rises above a predetermined level, vibration of the buffer container is halted so as to stop delivery of components to the delivery container. Thus, components are provided to the delivery container and conveyor track on a basis determined by the need at the workplace.

In the preferred embodiment of the invention, components are provided to the buffer container by means of a portable container which is used for storage of components. The portable container has a serpentine chamber and an opening. The container is secured to a mounting bracket on the delivery apparatus so that the opening is positioned above the top of the buffer container. A vibration apparatus is provided to vibrate the storage container so as to cause components to fall from the storage container into the buffer container. An optical sensor is provided to stop the vibrator apparatus when components in the buffer container reach a predetermined level. Thus, as is the case with feeding components from a buffer container to the delivery container, the delivery of components to the buffer container is accomplished by means of the positive application of vibrational force, and no movable gates of any sort are employed. The potential of jamming is thus greatly minimized.

BRIEF DESCRIPTION OF THE DRAWINGS

The invention will be described with reference to the accompanying drawings, wherein:

FIG. 2 is a side view of the apparatus of the present invention; and

FIG. 3 is a diagramatic illustration of a vibrator unit used with the present invention.

DESCRIPTION OF THE PREFERRED EMBODIMENT

Figure 1:
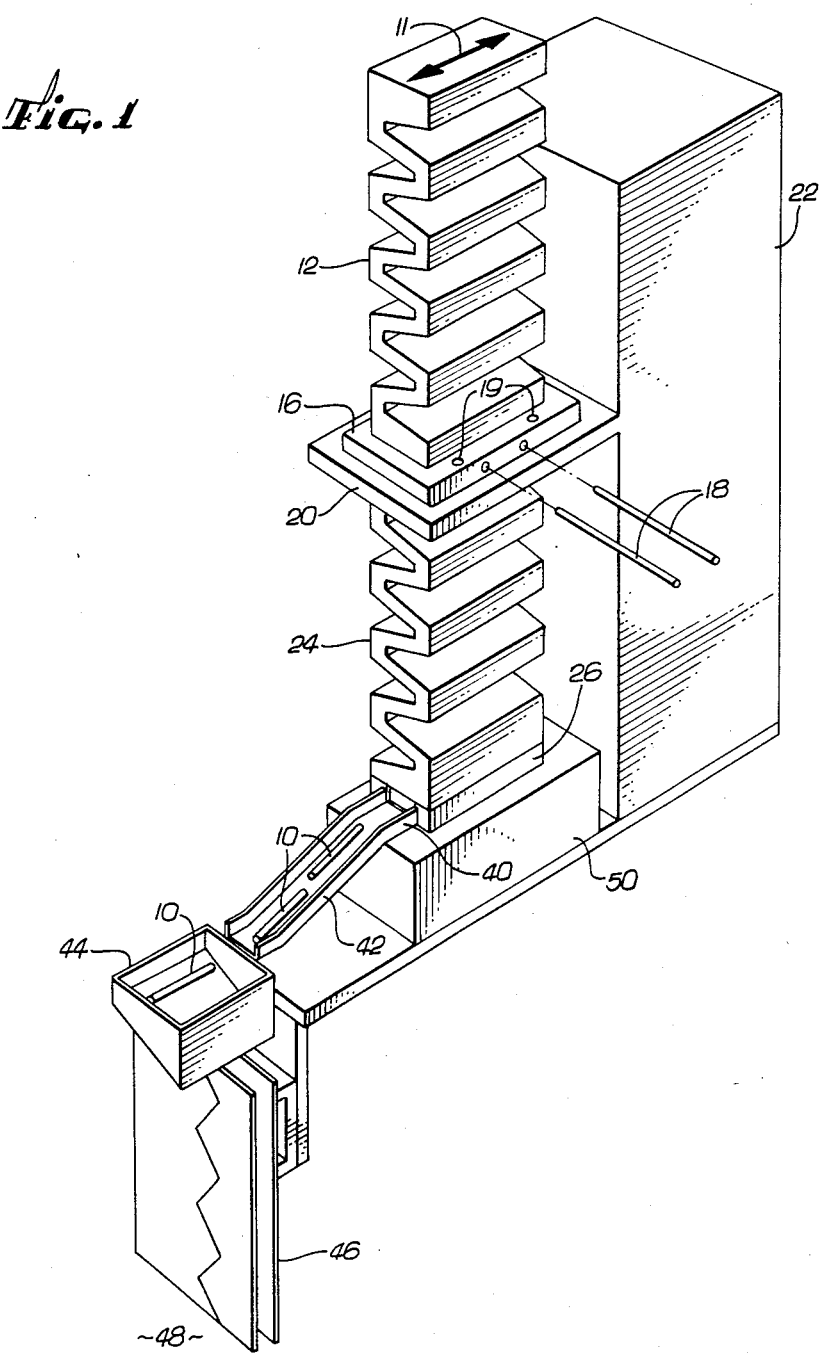
FIG. 1 is a perspective view of the apparatus of the present invention.

The following description is of the best presently contemplated mode of carrying out the invention. This description is made for the purpose of illustrating the general principles of the invention and is not to be taken in a limiting sense. The scope of the invention is best determined by reference to the accompanying claims.

Referring to FIGS. 1 and 2, a plurality of axial lead components 10, such as diodes, resistors or capacitors, are carried in a storage container 12. The cylindrical components extend generally in a direction indicated by arrow 11. The container 12 has a serpentine chamber defined by interleaved horizontal extensions and the components are oriented in a substantially parallel fashion within the chamber. The details of the container 12 are disclosed in U.S. Pat. No. 4,092,055, issued on May 30, 1978, to Robert Wullenwaber, the disclosure of which is incorporated herein by reference. The containers are filled in a separate operation, and components near the bottom will typically be more nearly parallel to one another than those near the top, due to the aligning operation performed when the components move through the serpentine chamber. Typically, the container 12 will have a top snap-fit closure which is removed during the filling operation. To unload the components, a top adaptor 16 is placed over the top opening of the container 12. The adaptor 16 includes an opening corresponding to the opening at the top of the container 12 and a pair of needles 18 which are slidably inserted across the opening in the adaptor 16. The container with components is then inverted and placed upon a platform 20 which extends from the main housing 22 of the apparatus. The needles 18 function to retain the components within the container when the container is inverted.

A buffer container 24 is carried on a vibrator table 26 and has a top opening spaced slightly below the bottom of the platform 20. After the storage container 12 is in place on the apparatus, the needles 18 are removed, and components can fall freely from the storage container 12 into the buffer container 24. The needles are reinserted through vertical holes 19 in the adapter plate 16 and into holes 21 in the platform 20, thereby locking the container and adapter plate to the platform. Because of the serpentine configuration of the chamber of the container, only a limited number of components will fall into the buffer container 24 under the force of gravity. In order to cause components to move through the container 12 and into the container 24, a first vibrator assembly 28 is employed to impart vibration to the storage container 12. As illustrated in FIG. 3, the vibrator assembly 28 may include a plunger 30 carried in a bearing 32. The plunger 30 is driven by a motor 34 via an eccentric 36 and crank 38. Other means of vibrating the container 12 may also be employed.

The buffer container 24 also has a serpentine chamber, similar to that of the container 12. Generally, the container 24 is defined by vertical walls having interleaved, horizontal sections extending into the interior of the container. Components will thus be supported within the container and will not move through the container to an appreciable extent without some external force being applied to the container. Components will therefore be maintained within the container without the requirement of any movable gates or the like. In addition, as the components move downwardly through the buffer chamber, they will become (or be maintained) substantially parallel to one another, as described in my previous U.S. Pat. No. 4,092,055.

The container 24 has a bottom horizontal exit track 40 which is connected to an inclined track 42. The exit track 40 extends in a direction parallel to the direction of the longitudinal axes of the components.

Components slide down the track 42 longitudinally. The delivery container 44 has a bottom surface which slopes to one side. The direction of movement of the components is changed 90°, and they now roll parallel and adjacent to one another exiting through a bottom opening in the container 44. The length 44a of the container is approximately equal to the length of the components 10. At the lower end of the track 42 is a delivery container or cup 44. The inclined track 42 serves two purposes. First, it serves to separate the components as they exit the buffer container 24 so that the components do not interfere with each other. Secondly, the components gain velocity on the track 42 so that they will fall into the container 44 in a uniform, horizontal orientation. The exit opening opens to a vertically oriented zig-zag track 46. The track 46 provides a single-file progression of components for delivery to a workplace indicated generally at 48. Various functions may be accomplished at the workplace 48, such as component testing, orientation marking or packaging.

A second vibration unit 50 is provided to impart vibration to the container 24 to cause components to move out of the buffer container 24 along the horizontal exit track 40 and subsequently down the track 42 to the delivery container 44. The vibrator 50 has a thrust greater in the forward direction than to the rear so as to facilitate the movement of components along the track 40. A fixed gate (not shown) may be provided at the exit of the buffer container 24 to control the size of the exit opening to limit the maximum component flow rate.

The vibrator units 28 and 50 operate independently from one another. They are controlled by a controller 52 which receives signals from optical sensors 54 and 56 and provides control signals to the vibrators. The details of the controller are not necessary for an understanding of the invention and will not be described herein. Components will be supplied to the workplace 48 at the exit of the zig-zag track 46 at a rate determined by the need at the workplace. If components are being supplied faster than needed, they will back up within the zig-zag track 46. If the components rise to the level of the sensor 54, their presence will be detected and a signal sent to the controller 52. The controller 52 will in turn shut off the vibrator unit 50 so as to prevent further components from being provided to the delivery container 44. In a similar fashion, if the level of components in the buffer container 24 rises to the level of the sensor 56, the vibrator 28 will be shut off to stop the flow of components from the storage container 12. Thus, component flow through the system is controlled by means of the actuation of the vibrator units, and no gates are moved in and out of the component flow path. The chances of jamming of the system are therefore substantially reduced.

In the present embodiment of the invention, the zig-zag track can empty, for example, one watt rectifiers at the rate of 50,000–70,000 components per hour. The delivery container 44 can empty at a rate of 35,000–45,000 components per hour. The buffer container 24 will empty at a rate determined by the fixed gate at its exit, and the storage container 12 has an emptying rate of over 70,000 components per hour. An overall delivery rate of approximately 35,000 components per hour can be achieved with the apparatus. Jamming of the delivery cup 44 is prevented by employing the vibrator 50, and the invention achieves smooth, jam-free operation in a simple and efficient fashion. The present invention provides faster feed rates than prior art systems, is not prone to jamming, does not damage components and does not require extra operations before or after feeding such as lead straightening or untangling of haystacked components.

It should be noted that when the storage container 12 is nearly empty, it can be changed while components are still being fed through the remainder of the system. Container changing may be accomplished in a matter of seconds, thus avoiding interruption in the feeding of components. Either manual or automatic changing of storage containers may be employed. It should also be noted that dimensions of various elements of the invention may be adjusted to accommodate various component configurations.

What is claimed is:

1. Apparatus for feeding cylindrical components to a workplace, comprising:
   a buffer assembly receiving initially substantially longitudinally oriented bulk cylindrical components and temporarily storing the components in a vertically extending stack, said buffer assembly having a single storage chamber through which the components pass while maintaining their initial orientations, the buffer assembly maintaining the components within the chamber in the absence of an external force, and a permanently open exit;
   a vibrator unit for vibrating the buffer assembly to cause components to move from the storage chamber and out the exit;
   a delivery system including (a) a delivery chamber located below the buffer exit for receiving components, said delivery chamber having a lower outlet, and (b) a substantially vertical conveyor track connected to the outlet for transporting a single-file progression of parallel components to a workplace; and
   control means for operating the vibrator unit when the level of components in the conveyor track is below a predetermined level and stopping the vibrator unit when the level of components in the conveyor track is above a predetermined level, said apparatus maintaining the initial orientations of the components from the buffer assembly to the conveyor track;
   the buffer assembly including a container having a top with an opening for receiving components, vertically extending sidewalls, a plurality of interleaved horizontal extensions extending inwardly from opposed sidewalls to define a serpentine storage chamber, and a bottom coupled to the exit of the buffer assembly, wherein the storage chamber terminates at an opening at the bottom of a sidewall and wherein the exit of the buffer assembly comprises a horizontal track coupled to the opening and extending in a direction generally parallel to the longitudinal direction of the components, wherein operation of the vibrator unit causes components to move through the serpentine storage chamber and along the horizontal track in a direction generally parallel to their longitudinal direction.

2. Apparatus according to claim 1 wherein the delivery assembly includes an inclined track located between the horizontal track and the delivery chamber, wherein components slide down said inclined track in a longitudinal orientation thereby facilitating loading of components into the delivery chamber in parallel alignment.

3. Apparatus according to claim 1 wherein the storage chamber of the buffer assembly has a top opening and wherein components are provided to the buffer assembly from a storage container having a delivery opening, said apparatus including:
   means for supporting a storage container above the buffer assembly to deliver components thereto via the top opening;
   a second vibrator unit for vibrating the storage container to cause components to fall out of the delivery opening and into the buffer assembly; and
   second control means for controlling the operation of the second vibrator unit as a function of the level of components in the buffer assembly.

4. Apparatus according to claim 3 including a storage container, wherein the storage container includes a vertically oriented serpentine storage chamber having a bottom delivery opening.

5. Apparatus according to claim 1 wherein the conveyor track has a zig-zag configuration.

6. Apparatus for feeding cylindrical components to a workplace, comprising:
   a buffer container having a top with an opening receiving initially partially longitudinally oriented cylindrical components, a bottom, vertically extending sidewalls and a permanently open exit at the bottom of the sidewalls for feeding components out of the buffer container along a horizontal path in a direction generally parallel to their longitudinal direction, said buffer container receiving and transporting the components from the top opening to the exit while maintaining the initial component orientations, supporting at least components near the bottom thereof in horizontal parallel alignment and maintaining the components within the container in the absence of an external force;
   vibrator means for applying a vibratory force to the buffer container to cause components to be fed from the exit opening along the horizontal path;
   a delivery container located at a position below the horizontal pathway for receiving components and positioning them so that they are generally parallel and are maintained in their initial orientation, said delivery container having a bottom exit opening;
   a substantially vertical conveyor track connected to the bottom exit opening for transporting cylindrical components in a single-file progression in a direction perpendicular to their longitudinal direction to a feed outlet adjacent the workplace; and
   control means for determining when components are backed up in the conveyor track to a predetermined point and halting the operation of the vibrator means to stop feeding components from the buffer container to the delivery container.

7. Apparatus for feeding cylindrical components to a workplace from a storage container having a serpentine storage chamber and an exit, comprising:
   a housing;

a mounting assembly on the housing for supporting a storage container in a vertically upright orientation;

a first vibrator unit carried by the housing for vibrating the storage container to cause components to exit therefrom;

a buffer container carried by the housing below the mounting assembly, said buffer container having (a) an open top end, positioned below the exit of a storage container, receiving initially partially longitudinally oriented components from the storage container, (b) a vertically extending serpentine buffer chamber transporting the components from the buffer container top to a bottom exit while maintaining the initial component orientations and supporting the components in a horizontal configuration substantially parallel to each other, wherein the components move through the chamber in a direction generally perpendicular to their longitudinal orientation, and (c) a horizontal exit track extending from the bottom exit of the buffer chamber in a direction parallel to the longitudinal orientation of the components wherein the buffer chamber bottom exit is permanently open to the exit track and will maintain components within the chamber in the absence of movement of the chamber;

a second vibrator unit for vibrating the buffer container to cause components to move from the buffer chamber to the exit track;

a downwardly inclined track coupled to the exit track;

a delivery container for receiving components from the inclined track and supporting the components in parallel alignment and their initial relative orientations, said delivery container having a bottom outlet for passing a single-file progression of components in a direction perpendicular to the longitudinal orientation of the components;

a vertically oriented zig-zag conveyor track coupled to the outlet of the delivery container for transporting components in single file to a workplace; and control means for (a) selectively operating the second vibrator unit as a function of the level of components in the conveyor track to control the rate at which components are supplied to the delivery container from the buffer container, and (b) selectively operating the first vibrator unit as a function of the level of components in the buffer container to control the rate at which components are supplied from a storage container to the buffer container.

* * * * *